(12) United States Patent
Juan

(10) Patent No.: US 7,609,599 B2
(45) Date of Patent: Oct. 27, 2009

(54) METHOD OF IDENTIFYING A TYPE OF AN OPTICAL DISC AND THE DEVICE THEREFOR

(75) Inventor: Kuan-Kai Juan, Jhubei (TW)

(73) Assignee: Mediatek Inc., Hsin-Chu (TW)

( * ) Notice: Subject to any disclaimer, the term of this patent is extended or adjusted under 35 U.S.C. 154(b) by 593 days.

(21) Appl. No.: 11/356,204

(22) Filed: Feb. 17, 2006

(65) Prior Publication Data

US 2007/0195670 A1   Aug. 23, 2007

(51) Int. Cl.
*G11B 7/00* (2006.01)

(52) U.S. Cl. .................................... 369/53.23

(58) Field of Classification Search ............... None
See application file for complete search history.

(56) References Cited

U.S. PATENT DOCUMENTS

| | | | |
|---|---|---|---|
| 5,003,521 A | | 3/1991 | Yoshida et al. |
| 5,684,773 A | * | 11/1997 | Hayashi .................... 369/47.35 |
| 5,901,125 A | * | 5/1999 | Doi .......................... 369/53.22 |
| 5,903,531 A | * | 5/1999 | Satoh et al. ............... 369/44.29 |
| 6,021,102 A | | 2/2000 | Seto et al. |
| 6,058,082 A | | 5/2000 | Hwang |
| 6,110,123 A | * | 8/2000 | Ishihara et al. ............... 600/534 |
| 6,166,682 A | * | 12/2000 | Kosugi et al. ................ 342/192 |
| 6,366,937 B1 | * | 4/2002 | Shridhar et al. ............. 708/409 |
| 6,501,712 B1 | | 12/2002 | Masuda et al. |
| 6,747,931 B1 | * | 6/2004 | Park ......................... 369/53.23 |
| 7,376,581 B2 | * | 5/2008 | DeRose et al. ................ 705/14 |
| 2002/0041551 A1 | * | 4/2002 | Konno et al. ............. 369/53.23 |
| 2002/0150017 A1 | * | 10/2002 | Ono et al. ................. 369/53.23 |
| 2004/0151099 A1 | * | 8/2004 | Hsu et al. ................. 369/53.23 |
| 2005/0015687 A1 | * | 1/2005 | Lai et al. ..................... 714/700 |
| 2005/0030867 A1 | * | 2/2005 | Choi et al. ............... 369/53.23 |
| 2005/0174907 A1 | * | 8/2005 | Huang ....................... 369/53.2 |
| 2005/0270924 A1 | * | 12/2005 | Yanagawa et al. ......... 369/44.32 |
| 2006/0077798 A1 | * | 4/2006 | Kuroda et al. ............ 369/44.25 |

FOREIGN PATENT DOCUMENTS

CN        1549265 A        11/2004

* cited by examiner

*Primary Examiner*—Peter Vincent Agustin
(74) *Attorney, Agent, or Firm*—Rabin & Berdo, P.C.

(57) ABSTRACT

A method of identifying a type of an optical disc applied in an optical drive is provided. The optical drive at least comprises an optical pickup head. First, move the optical pickup head continually from an initial position. Then, emit a light beam on an optical disc continually and receive a reflected light beam from the optical disc to generate a servo signal. Next, detect a waveform pattern of the servo signal continually to determine whether the waveform pattern of the servo signal changes, if so, the optical disc is identified as a Digital Video Disk-Random Access Memory (DVD-RAM).

20 Claims, 5 Drawing Sheets

DPD Signal

A  B  C  D

DPP Signal

410

METHOD OF IDENTIFYING A TYPE OF AN OPTICAL DISC AND THE DEVICE THEREFOR

BACKGROUND OF THE INVENTION

1. Field of the Invention

The invention relates in general to a method of identifying a type of an optical disc, and more particularly to a method of identifying a Digital Video Disc-Random Access Memory (DVD-RAM).

2. Description of the Related Art

Nowadays, Digital Video Discs (DVDs) are categorized into Read Only Memory DVD (DVD-ROM), write-once DVDs (DVD+R or DVD-R), Rewriteable DVDs (DVD+RW or DVD-RW) and DVD-RAM. Among all types of DVDs, the specification of DVD-RAM is the most complicated. FIG. 1 shows the outline of the DVD-RAM disc. The DVD-RAM disc 100 is divided into an embossed area 120 and a rewriteable area 110. The embossed area 120 is located in the inner tracks of the DVD-RAM disc for providing the information of the disc such as the storage capacity or the type of the disc. There is no embossed area in other types of DVDs. Moreover, the most distinguishable feature of the DVD-RAM disc is that the DVD-RAM disc has a number of headers 130 in the rewriteable area. The physical addresses of data are stored in the header such that data can be written in or deleted from the DVD-RAM disc anytime like a hard disk.

The optical drives in the current market typically support every DVD standard. Whenever an optical disc is placed in, the optical drive determines the type of the disc firstly. The following steps determine whether the disc is a DVD-RAM disc. After the optical disc in the optical drive begins to spin, the optical drive calculates the amount of headers per track 140. If the calculated amount of the headers is larger than a predetermined amount, the optical disc is identified as a DVD-RAM. However, if the optical disc in the optical drive is not a DVD-RAM disc but a DVD+RW disc or a DVD-RW disc, the noise in the detected signal when reading the empty tracks may be mistook for headers by the optical drive. It may further result in the optical drive inaccessible to the optical disc.

Therefore, how to determine whether the optical disc is DVD-RAM or not correctly and efficiently is an important issue for the optical drive to access the optical disc properly.

SUMMARY OF THE INVENTION

It is therefore an object of the invention to provide a method of identifying a type of an optical disc correctly and efficiently, such that an optical drive can access the optical disc properly.

The invention achieves the above-identified object by providing a method of identifying a type of an optical disc applied in an optical drive having an optical pickup head. The method begins by moving the optical pickup head continually from an initial position. Then, a step is performed to emit a light beam on an optical disc continually and receive a reflected light beam from the optical disc to generate a servo signal. Next, another step is also performed to detect a waveform pattern of the servo signal continually to determine whether the waveform pattern of the servo signal changes, if so, the optical disc is identified as a Digital Video Disk-Random Access Memory (DVD-RAM).

The invention achieves the above-identified object also by providing an optical drive comprising an optical pickup head, a servo signal controller and a signal processing unit. The optical pickup head is operable to emit a light beam on an optical disc continually to receive a reflected light beam from the optical disc for generating a servo signal. The servo signal is operable to move the optical pickup head continually based on the servo signal. The signal processing unit is operable to detect the waveform pattern of the servo signal continually. The optical drive is characterized by identifying the disc as a DVD-RAM disc when the signal processing unit detects the waveform pattern of the servo signal changes.

Other objects, features, and advantages of the invention will become apparent from the following detailed description of the preferred but non-limiting embodiments. The following description is made with reference to the accompanying drawings.

DETAILED DESCRIPTION OF THE INVENTION

A DVD-RAM disc has two areas with different characteristic on its surface, that is, embossed area and rewriteable area. There is an interface between these two areas. The optical drive according to the invention continually detects a servo signal and observes the waveform pattern of the servo signal while crossing the embossed/rewriteable interface. If the change of the waveform pattern occurs, the optical disc can be identified as a DVD-RAM disc.

Figure 1:
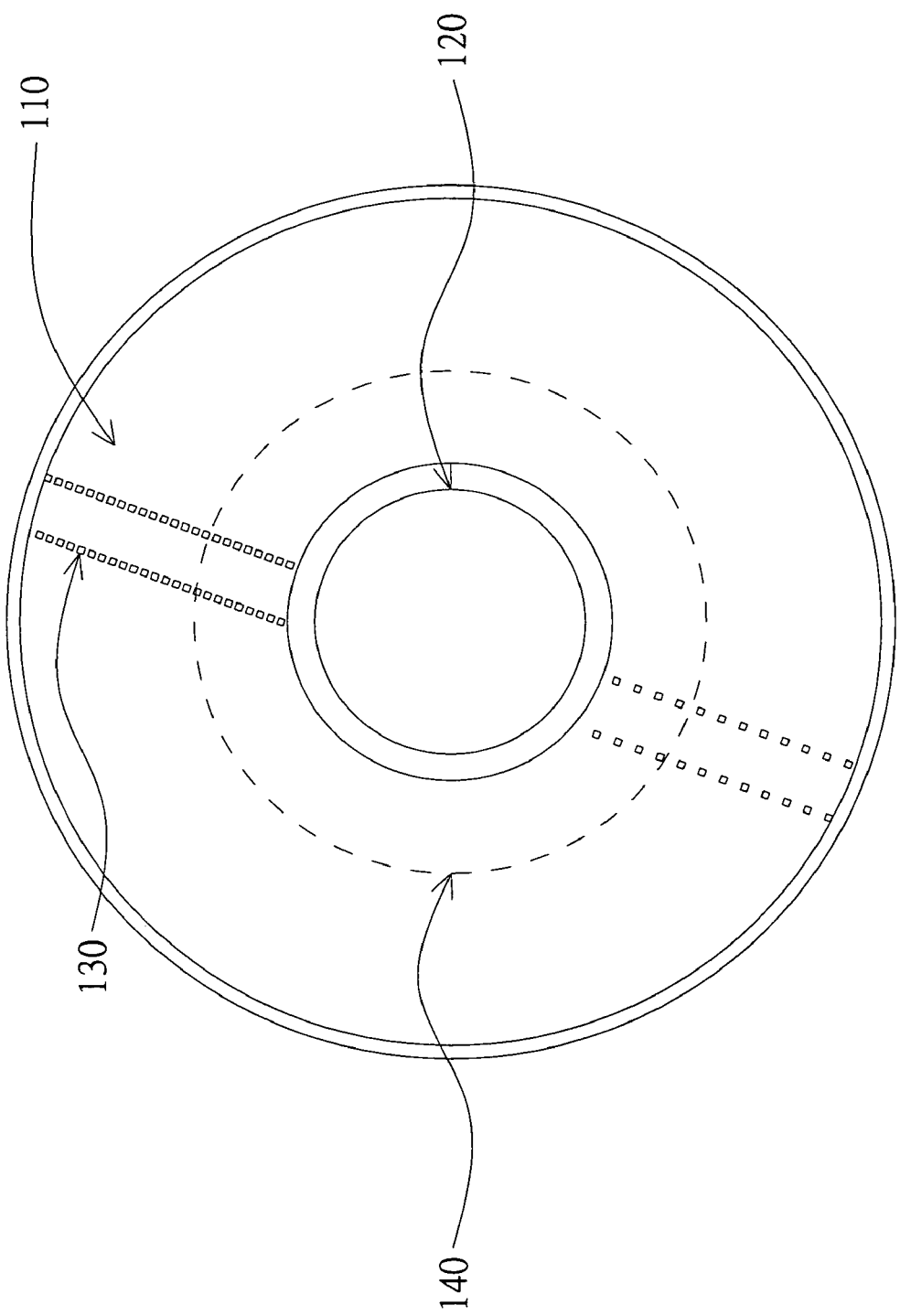
FIG. 1 shows the outline of a DVD-RAM disc.
Figure 2:
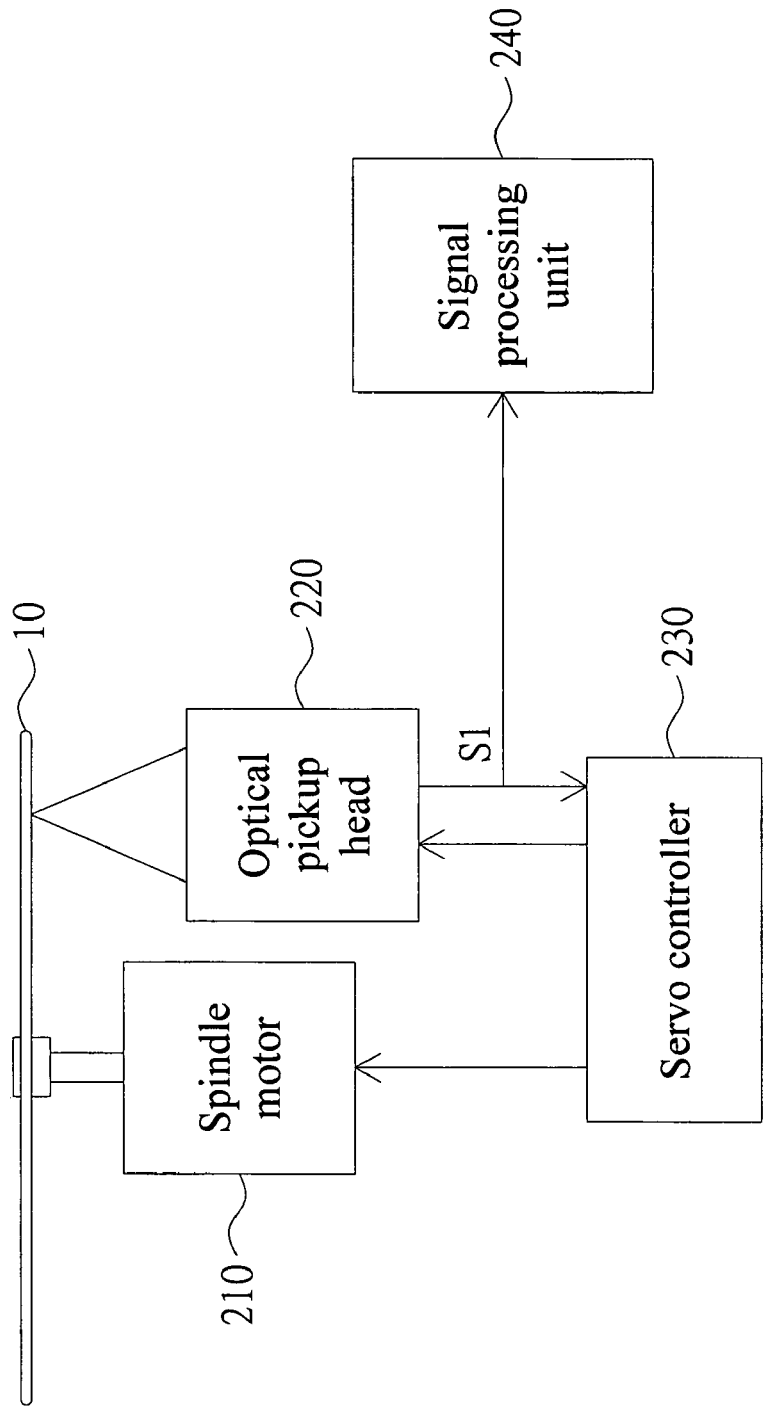
FIG. 2 shows a block diagram of the optical drive according to a preferred embodiment of the invention.

FIG. 2 shows a block diagram of the optical drive according to a preferred embodiment of the invention. The optical drive 200 is operable to access the optical disc 10. The optical drive 200 comprises a spindle motor 210, an optical pickup head 220, a servo controller 230 and a signal processing unit 240. After the optical disc 10 is placed in, the spindle motor 210 begins to spin the optical disc 10. The optical pickup head 220 then emits a light beam on the optical disc 10 and receives a reflected light beam from the optical disc 10 to generate a servo signal S1. The servo controller 230 is operable to move the optical pickup head 220 according to the servo signal S1. The signal processing unit 240 determines whether the waveform pattern of the servo signal S1 changes.

Figure 3:
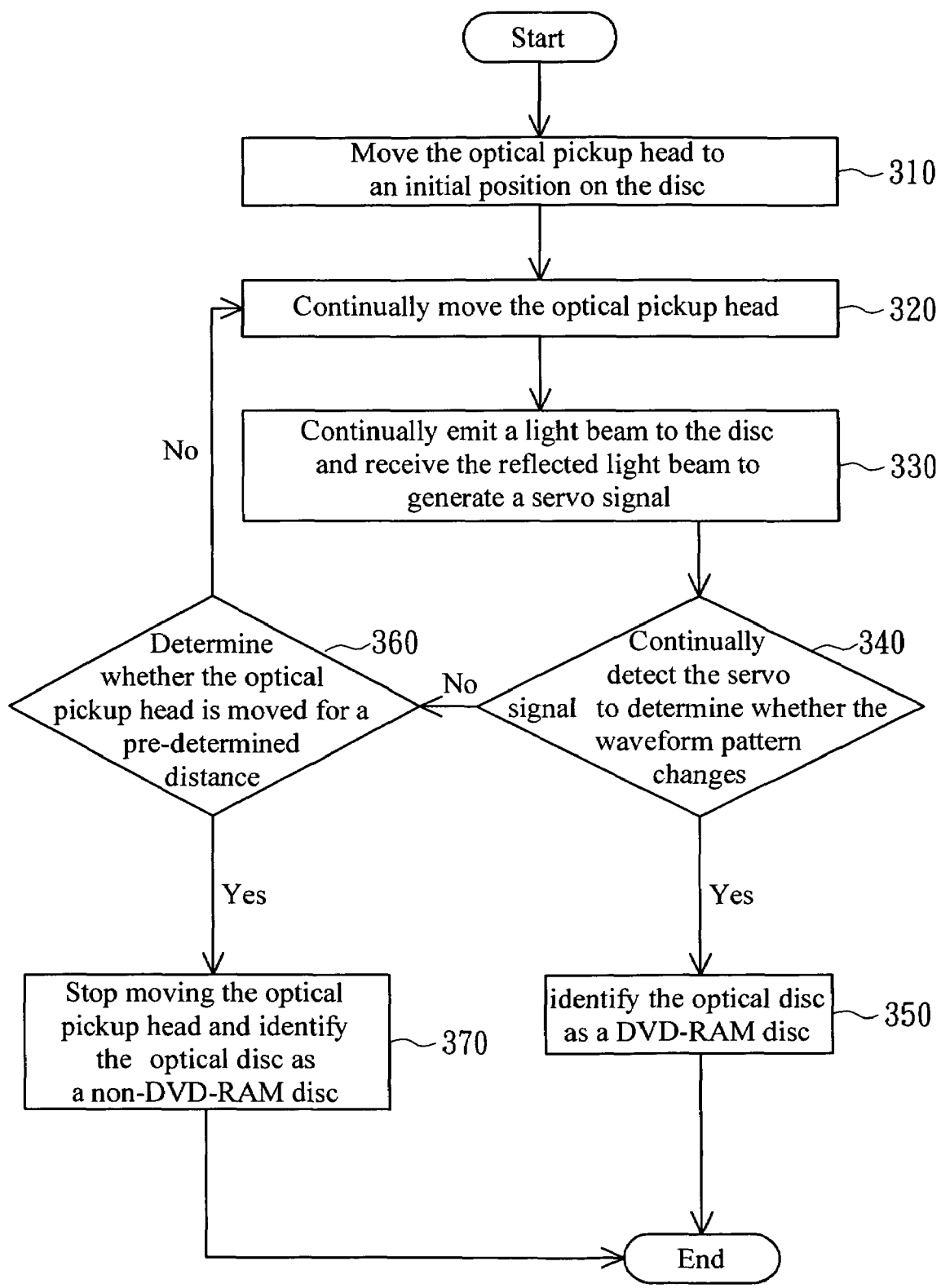
FIG. 3 shows a flow chart of the method of identifying a type of an optical disc according to the preferred embodiment of the invention.

FIG. 3 shows a flow chart of the method of identifying a type of an optical disc according to the preferred embodiment of the invention. The method is adapted in the optical drive 200. The method begins by moving the optical pickup head 220 to an initial position on the optical disc 10 after the optical disc 10 is placed in, as shown in step 310. Then, in the following step 320, the optical pickup head 220 is moved from the initial position. For example, the initial position is in the rewriteable area and the direction to move the optical pickup head 220 is from the outer track to the inner track of the disc. Next, step 330 is performed to emit a light beam on an optical disc 10 continually and receive a reflected light beam from the optical disc 10 to generate a servo signal. Next, step 340 is performed to detect a waveform pattern of the servo signal continually to determine whether the waveform pattern of the servo signal changes. If so, step 350 is performed to identify the optical disc as a DVD-RAM disc.

In step 340, if the waveform pattern of the servo signal remains unchanged, then step 360 is performed to determine whether the optical pickup head has been continually moved for a pre-determined distance which for example is the distance between the initial position and the most inner track of the optical disc 10. If not, then return to step 320 to continually move the optical pickup head and detect the waveform pattern of the servo signal. In step 360, if the optical pickup head 220 has been continually moved for the pre-determined distance, then stop moving the optical pickup head 220 and identify the optical disc 10 as a non-DVD-RAM disc, as shown in step 370.

Because of the interface between embossed area and rewriteable area, the waveform pattern of the servo signal will change significantly when the optical pickup head 220 crosses the interface. Thus, according to the preferable embodiment of the invention, step 340 is performed to detect the waveform pattern continually. The following is the further illustrations of waveform patterns of different servo signals and the preferable detecting methods in accordance with the servo signals.

Figure 4A:
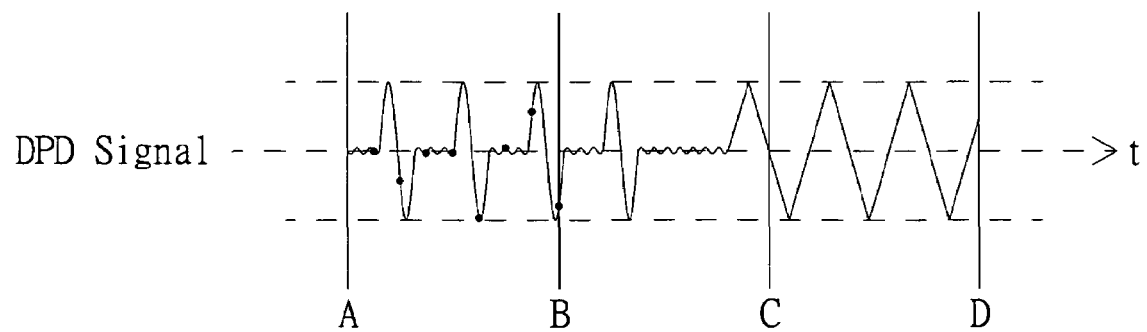
FIG. 4A shows a waveform pattern of a Differential Phase Detection (DPD) signal as a servo signal according to the preferred embodiment of the invention.

FIG. 4A shows a waveform pattern of a Differential Phase Detection (DPD) signal as a servo signal according to the preferred embodiment of the invention. When the optical pickup head 220 is in the rewriteable area and passes through headers, pulses are generated in the DPD signal. As the optical pickup head is continually moved from the outer track to the inner track of the optical disc 10 and crosses the embossed/rewriteable interface, the waveform pattern of the DPD signal changes to a triangular waveform pattern in the embossed area. According to the characteristic that the DPD signal in the different areas with different waveform patterns, the detection of the waveform pattern of the DPD signal can be accomplished by sampling the DPD signal periodically to compare the average voltage of the DPD signal to a threshold value, for example. As shown in FIG. 4a, the signal processing unit is operable to sample eight voltage values of the DPD signal during the period between time point A and B. Then, the signal processing unit sorts these sampled voltage values according to their magnitude. Next, the signal processing unit eliminates the several bigger voltages and only calculates the average of the remaining smaller voltages. Repeat the step of sampling and averaging during the period between time point B and C and the period between time point C and D. After that, the signal processing unit compares the averaged voltage value of the periods with the threshold value. The averaged voltage value is smaller than the threshold value in the rewriteable area, and the averaged voltage value is larger than the threshold value in the embossed area. When the comparing result is changed from being smaller than the threshold value to being larger than the threshold value, the optical disc is identified as DVD-RAM. Preferably, the sample rate is substantially unequal to the rate of the pulse corresponding to the headers and the multiple thereof.

Figure 4B:
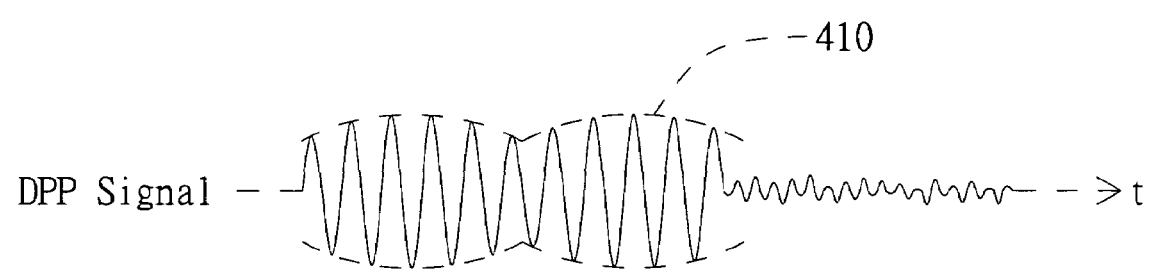
FIG. 4B shows a waveform pattern of a Differential Push-Pull (DPP) signal as a servo signal according to the preferred embodiment of the invention.

FIG. 4B shows a waveform pattern of a Differential Push-Pull (DPP) signal as a servo signal according to the preferred embodiment of the invention. In the rewriteable area, the waveform pattern of the DPP signal has an envelope 410. As the optical pickup head is moved from the outer track to the inner track of the optical disc and crosses the embossed/rewriteable interface, the waveform pattern changes. According to the characteristic that the DPP signal in the different areas with different waveform patterns, the detection of the waveform pattern of the DPP signal can be achieved by comparing the amplitude of the DPP signal to a threshold value, for example. As shown in FIG. 4B, the average voltage of the DPP signal in the rewriteable area is larger than that in the embossed area. When the comparing result is changed from being larger than the threshold value to being smaller than the threshold value, the optical disc is identified as a DVD-RAM disc.

Figure 4C:
FIG. 4C shows a waveform pattern of a Radio Frequency Level (RF Level) signal as a servo signal according to the preferred embodiment of the invention.

FIG. 4C shows a waveform pattern of a Radio Frequency Level (RF Level, is the sum of mainbeam) signal as a servo signal according to the preferred embodiment of the invention. When the optical pickup head 220 is in the rewriteable area and passes through headers, pulses are generated in the RF Level signal. As the optical pickup head is moved from the outer track to the inner track of the optical disc 10 and crosses the embossed/rewriteable interface, the waveform pattern of the RF Level signal changes. According to the characteristic that the RF Level signal in the different areas with different waveform patterns, the detection of the waveform pattern of the RF Level signal can be achieved by comparing the amplitude of the RF Level signal to a threshold value, which is similar to what mentioned above.

In addition, the detection of the waveform pattern of the RF Level signal can also be achieved by calculating the period of the pulses corresponding to the headers in the RF Level signal. If the optical disc is a DVD-RAM disc, the impulse period can be calculated out to be some definite value while the optical pickup head is in the rewriteable area. However, after the optical pickup head enters the embossed area, the impulse period is calculated to be infinity. Therefore, when the calculated impulse period is changed from some definite value to infinity, the optical disc is identified as a DVD-RAM disc.

Moreover, to determine whether the waveform pattern of the RF Level signal changes can also be accomplished by comparing the frequency spectrum of the RF Level signal generated by Fast Fourier Transform to a pre-determined frequency spectrum. As shown in FIG. 4C, the signal processing unit is operable to sample the RF Level signal and proceed to generate a spectrum by transforming the sampled values. The magnitude of the pulses corresponding to the headers in frequency domain is larger than a threshold value in the rewriteable area, while the magnitude of the pulses corresponding to the headers in frequency domain is smaller than the threshold value in the embossed area. Therefore, when the magnitude of the pulses in frequency domain is detected to be changed from being larger than the threshold value to being smaller than the threshold value, then the optical disc is identified as a DVD-RAM disc.

Figure 4D:
FIG. 4D shows a waveform pattern of a Focus Error (FE) signal as a servo signal according to the preferred embodiment of the invention.

FIG. 4D shows a waveform pattern of a Focus Error (FE) signal as a servo signal according to the preferred embodiment of the invention. When the optical pickup head is in the rewriteable area and passes through headers, the pulses are generated in the FE signal. As the optical pickup head is moved from the outer track to the inner track of the optical disc and crosses the embossed/rewriteable interface, the waveform pattern of the FE signal changes. According to the characteristic that the FE signal in the different areas with different waveform patterns, the detection of the waveform pattern of the FE signal can be achieved by the method mentioned above to compare the amplitude of the FE signal to a threshold value, or to calculate the pulse period corresponding to the headers, or to compare the frequency spectrum of the FE signal generated by Fast Fourier Transform to a predetermined frequency spectrum. The detailed steps are similar to that of the RF Level signal mentioned above.

Figure 4E:
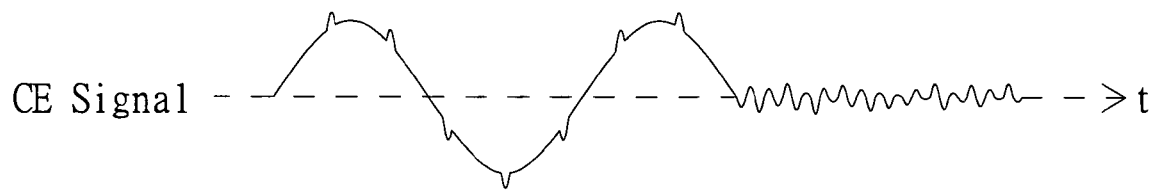
FIG. 4E shows a waveform pattern of a Center Error (CE) signal as a servo signal according to the preferred embodiment of the invention.

FIG. 4E shows a waveform pattern of a Center Error (CE) signal as a servo signal according to the preferred embodiment of the invention. In the rewriteable area, the waveform pattern of the CE signal is a waveform pattern of a sinusoidal signal with pulses when the optical pickup head passes the headers. As the optical pickup head is moved from the outer track to the inner track of the optical disc and crosses the embossed/rewriteable interface, the waveform pattern of the CE signal changes. According to the characteristic that the CE signal in the different areas with different waveform patterns, the detection of the waveform pattern of the CE signal can be achieved by the method mentioned above to compare the amplitude of the CE signal to a threshold value, or to calculate the pulse period corresponding to the header, or to compare the frequency spectrum of the CE signal generated by Fast Fourier Transform to a pre-determined frequency spectrum. The detailed steps are similar to that of the FE signal mentioned above.

The servo signal of the embodiment has been illustrated above as the DPD signal, the DPP signal, the RF Level signal, the FE signal and the CE signal respectively; however, in practice, it is not limited thereto. In order to achieve a more precise result, the detection method can be chosen according to the features of the servo signals, and more than one of the servo signals can be chosen to complete the detection method. For example, both the DPD signal and the RF Level can be chosen simultaneously to proceed the detection of the waveform pattern.

The initial position of the embodiment illustrated above is in the rewriteable area, and the direction of moving the optical pickup head is from the outer track to the inner track of the optical disc. However, in practice, it is not limited thereto. The initial position can also be set in the embossed area and the optical pickup head is then moved from the inner track to the outer track of the optical disc. Thus, the waveform patterns of the servo signals should be inverted and detecting method should also be adjusted to accord with the waveform patterns.

The method of identifying the type of the optical disc and the optical drive disclosed by the invention takes advantage of the DVD-RAM disc that the waveform pattern of the servo signal change while the optical pickup head is crossing the embossed/rewriteable interface. Because other types of discs do not have the embossed area, the waveform pattern of the servo signal may remain unchanged. In comparison to the conventional method, the method of invention which is achieved by detecting the waveform patterns of the servo signals already existing in the optical drive can identify the type of the disc more correctly and efficiently. Furthermore, when using more than one type of the servo signals, the accuracy rate of identifying the type of the optical disc is further improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of identifying a type of an optical disc applied in an optical drive, the optical drive having an optical pickup head, the method comprising:
   moving the optical pickup head continually from an initial position across an interface of an embossed area and a rewriteable area;
   emitting a light beam on an optical disc continually and receiving a reflected light beam from the optical disc to generate a servo signal; and
   detecting a waveform pattern of the servo signal continually to determine whether the waveform pattern of the servo signal changes, and if so, identifying the optical disc as a Digital Video Disc-Random Access Memory (DVD-RAM) disc.

2. The method according to claim 1, wherein in the step of detecting a waveform pattern of the servo signal continually, if the waveform pattern of the servo signal remains unchanged, the method further comprises: proceeding with moving the optical pickup head and detecting the servo signal; stopping moving the optical pickup head if the waveform pattern of the servo signal keeps unchanged after the optical pickup head has been continually moved for a pre-determined distance, and then the optical disc being identified as a non-DVD-RAM disc.

3. The method according to claim 2, wherein the pre-determined distance is the distance between the initial position and the most inner track of the optical disc.

4. The method according to claim 2, wherein the pre-determined distance is the distance between the initial position and the most outer track of the optical disc.

5. The method according to claim 1, wherein the optical pickup head is moved from an outer track to an inner track of the optical disc when the step of continually moving the optical pickup head is performed.

6. The method according to claim 1, wherein the optical pickup head is moved from an inner track to an outer track of the optical disc when the step of continually moving the optical head is performed.

7. The method according to claim 1, wherein the step of determining whether the waveform pattern of the servo signal changes is accomplished by comparing the amplitude of the servo signal to a threshold value.

8. The method according to claim 1, wherein the step of determining whether the waveform pattern of the servo signal changes is accomplished by comparing a frequency spectrum of the servo signal generated by Fast Fourier Transform to a pre-determined frequency spectrum.

9. The method according to claim 1, wherein the servo signal is selected at least one from the group consisting of a Differential Phase Detection (DPD) signal, a Differential Push-Pull (DPP) signal, a Radio Frequency Level (RF Level) signal, a Focus Error (FE) signal, a Center Error (CE) signal and the combinations thereof.

10. The method according to claim 1, wherein the servo signal comprises a DPD signal and a RF Level signal.

11. An optical drive comprising:
    a servo controller operable to move an optical pickup head based on a servo signal so that the optical pickup head emits a light beam on an optical disc continually and receives a reflected light beam from the optical disc for generating the servo signal; and
    a signal processing unit operable to determine whether the waveform pattern of the servo signal changes based on the servo signal;
    wherein the optical pickup head continually emits the light beam to the optical disc and continually receives the reflected light beam from the optical disc to generate the servo signal when the servo controller begins to move the optical pickup head continually from a initial position to across an interface of an embossed area and a rewriteable area, and the signal processing unit continually detects the waveform pattern of the servo signal;

wherein the signal processing unit identifies the optical disc as a DVD-RAM disc when the signal processing unit determines that the waveform pattern of the servo signal changes.

12. The optical drive according to claim 11, wherein the servo controller is further operable to stop moving the optical pickup head, and the signal processing unit identifies the disc as a non-DVD-RAM disc if the waveform pattern of the servo signal remains unchanged after the optical pickup head has been continually moved for a pre-determined distance.

13. The optical drive according to claim 12, wherein the pre-determined distance is the distance between the initial position to the most inner track of the optical disc.

14. The optical drive according to claim 12, wherein the pre-determined distance is the distance between the initial position to the most outer track of the optical disc.

15. The optical drive according to claim 11, wherein the servo controller continually moves the optical pickup head from an outer track to an inner track of the optical disc when the optical pickup head is moved from the initial position.

16. The optical drive according to claim 11, wherein the servo signal controller continually moves the optical pickup head from an inner track to an outer track of the optical disc when the optical pickup head is moved from the initial position.

17. The optical drive according to claim 11, wherein the signal processing unit determines whether the waveform pattern of the servo signal changes in manner of comparing the amplitude of the servo signal to a threshold value.

18. The optical drive according to claim 11, wherein the signal processing unit determines whether the waveform pattern of the servo signal changes in manner of comparing a frequency spectrum of the servo signal generated by Fast Fourier Transform to a pre-determined frequency spectrum.

19. The optical drive according to claim 11, wherein the servo signal is selected at least one from the group consisting of a Differential Phase Detection (DPD) signal, a Differential Push-Pull (DPP) signal, a Radio Frequency Level (RF Level) signal, a Focus Error (FE) signal, a Center Error (CE) signal and the combinations thereof.

20. The optical drive according to claim 11, wherein the servo signal comprises a DPD signal and a RF Level signal.

* * * * *

UNITED STATES PATENT AND TRADEMARK OFFICE
CERTIFICATE OF CORRECTION

| | | |
|---|---|---|
| PATENT NO. | : 7,609,599 B2 | Page 1 of 1 |
| APPLICATION NO. | : 11/356204 | |
| DATED | : October 27, 2009 | |
| INVENTOR(S) | : Kuan-Kai Juan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 845 days.

Signed and Sealed this

Twelfth Day of October, 2010

David J. Kappos
*Director of the United States Patent and Trademark Office*